Jan. 11, 1938. E. S. PEARCE ET AL 2,105,158
SPEEDOMETER
Filed Jan. 8, 1935  4 Sheets-Sheet 1
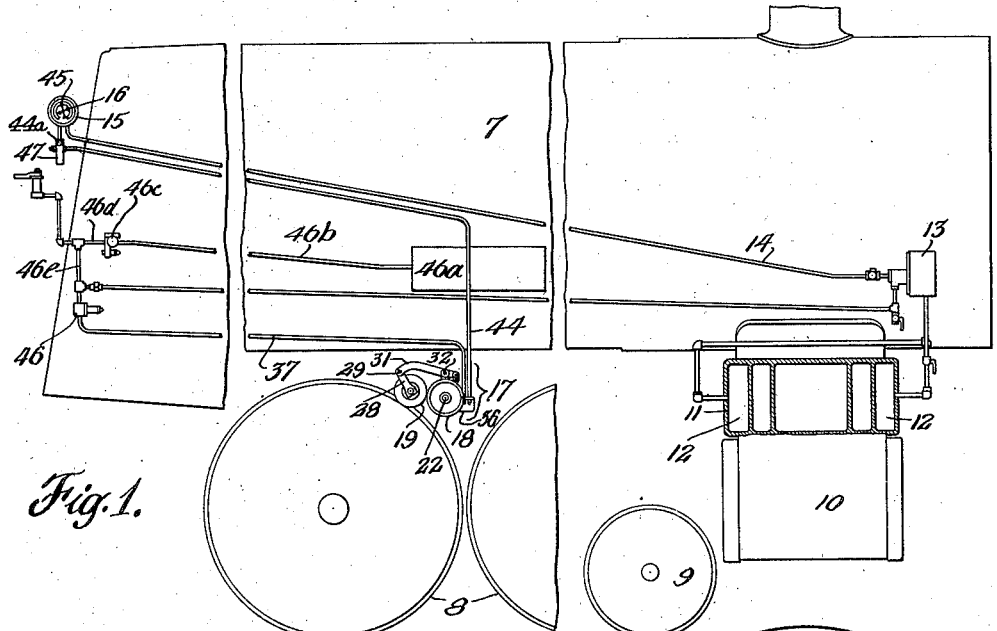
INVENTORS
Edmond C. Karibo
Edwin S. Pearce
BY
ATTORNEYS

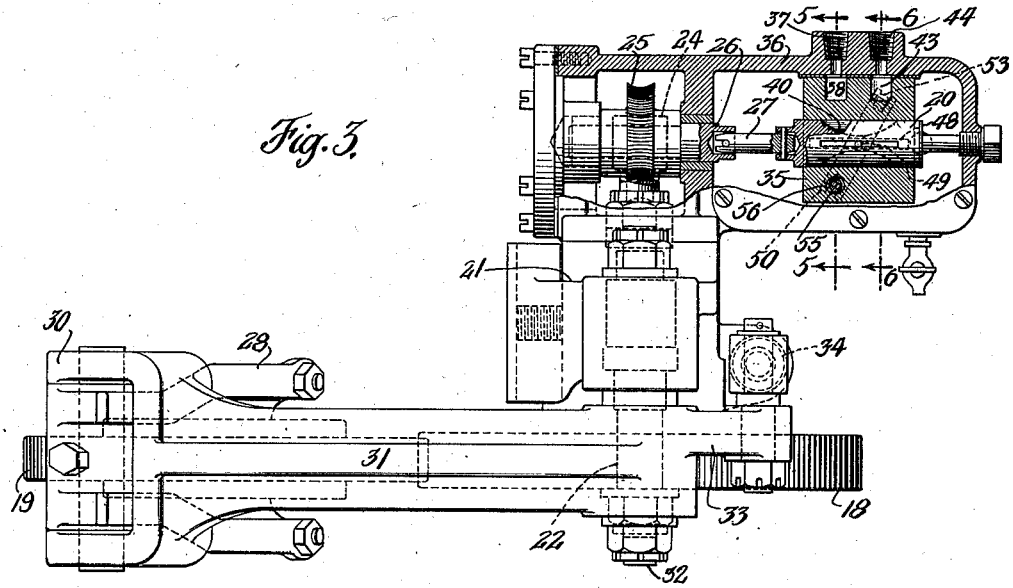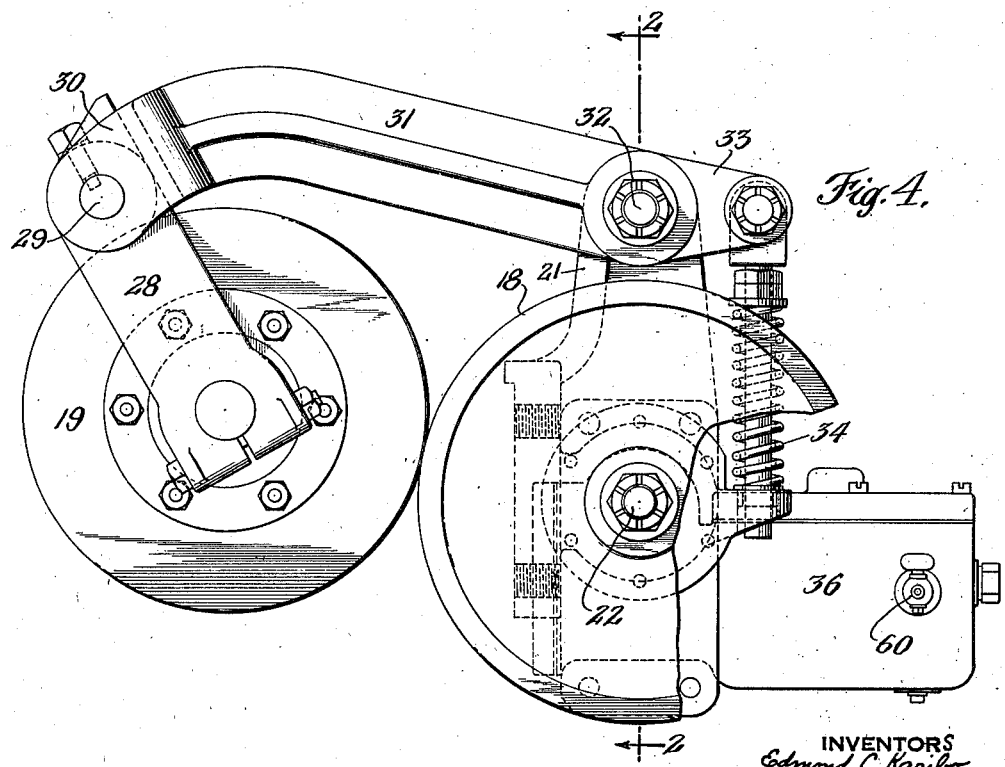

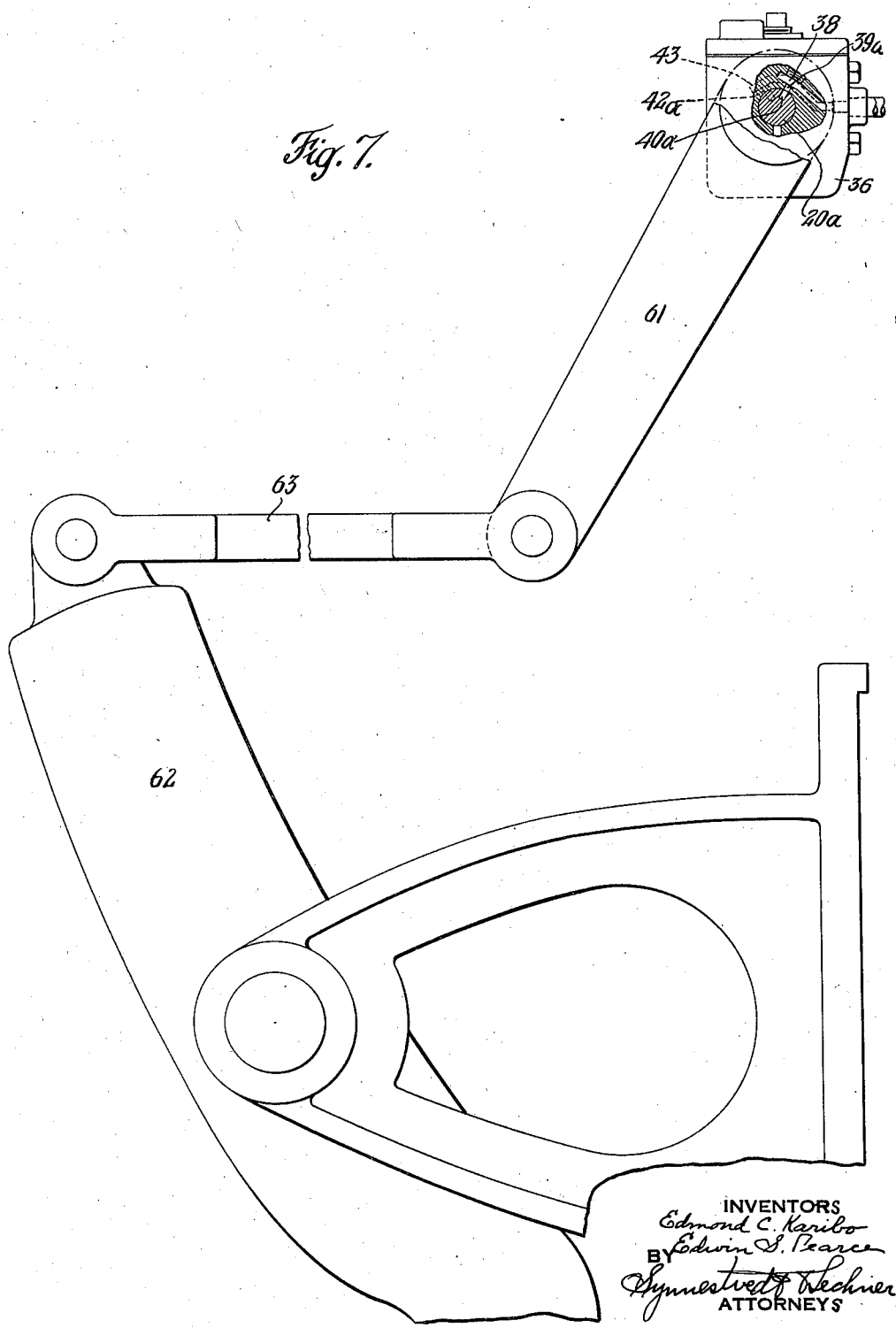

Patented Jan. 11, 1938

2,105,158

UNITED STATES PATENT OFFICE 2,105,158

SPEEDOMETER

Edwin S. Pearce and Edmond C. Karibo, Indianapolis, Ind., assignors to Transportation Devices Corporation, Indianapolis, Ind., a corporation of Indiana Application January 8, 1935, Serial No. 837

6 Claims. (Cl. 264—14)

This invention relates to speedometers and has for its principal objects the provision of a greatly simplified speed indicating device in which all mechanical operating connections between the driving point and the reading point are eliminated; the provision of a speed indicating device in which the possibility of error in the reading is reduced to a minimum as well as one in which the accuracy of the readings may be checked in an extremely simple manner; and the provision of such a device which is easily and cheaply manufactured as well as one which can be very readily and inexpensively kept in repair.

With somewhat more specific reference to the structure which we employ, further objects of the invention reside in the provision of a speedometer in which air under pressure is the medium used for translating the speed of the vehicle into accurate readings of such speed; the provision of a device of this character which will indicate the speed of the vehicle with equal accuracy in each direction of travel; and the provision of a device in which wear can be concentrated upon one portion or member thereof which is readily replaceable so that accuracy can be maintained at all times.

Although not limited to locomotive service the device has been developed for use in connection with locomotives so that the present disclosure will illustrate and describe the invention as embodied in a device which is particularly useful for railway vehicles.

In the accompanying drawings Figure 1 is a diagrammatic side elevation of a locomotive with our improvements applied thereto;

Figure 1A is a front elevation of the gauge used with our invention;

Figure 2 is a vertical section on an enlarged scale through a portion of our improved mechanism, taken as indicated by the line 2—2 in Figure 4;

Figure 3 is a plan view of the principal part of our device with a portion shown in horizontal section to illustrate certain of the details;

Figure 4 is a side elevation with a portion of one of the members broken away in order to show certain details which appear behind it;

Figure 7 is an illustration of a modification involving the use of an oscillating motion instead of a rotary motion in the meter as will further appear.

Figure 5:
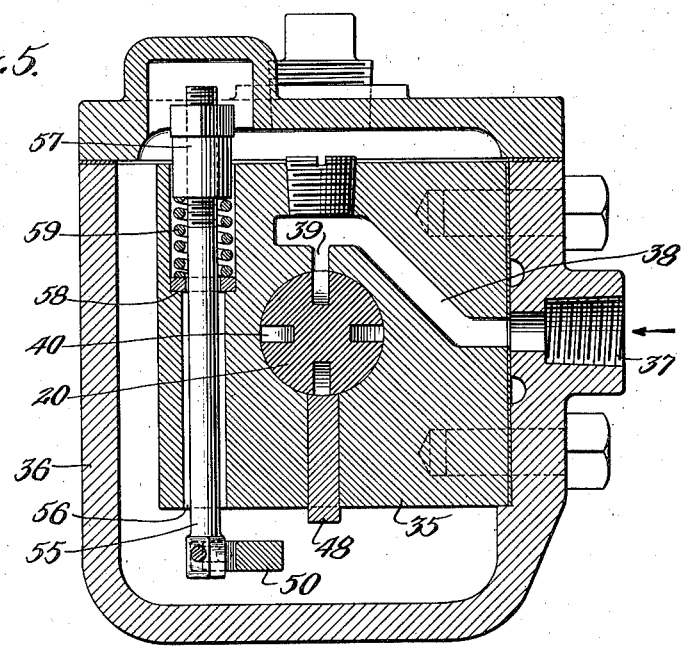
Figure 5 is a section on the line 5—5 of Figure 3.
Figure 6:
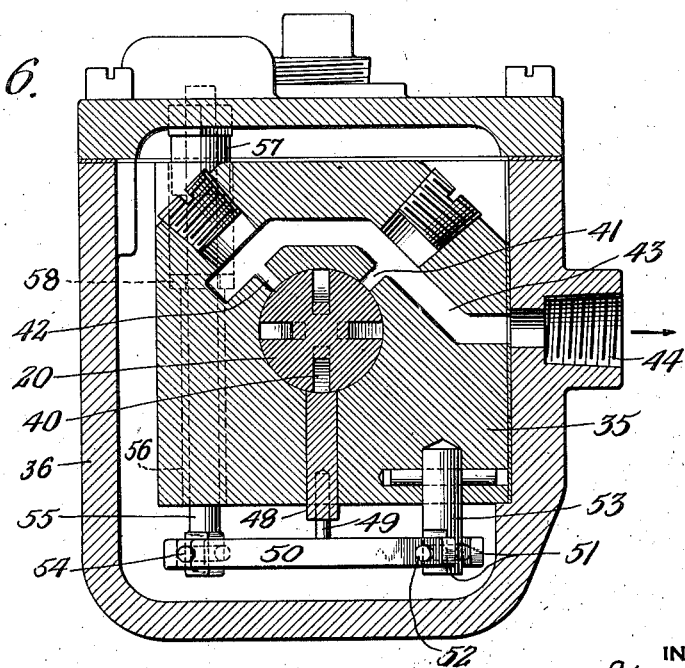
Figure 6 is a section on the line 6—6 of Figure 3.

Before proceeding with a detailed description of the drawings, we should like to point out that the invention is peculiarly adapted for use in connection with the locomotive back pressure indicating device which is disclosed and claimed in United States patent to C. W. Harris No. 1,826,280 issued on October 6, 1931. In view of this, certain portions of the mechanism described in said patent are shown in Figure 1 of the present drawings. Attention is called to this fact, however, not by way of limitation but simply by way of explanation.

By referring to the drawings it will be seen that we have illustrated in outline the boiler 7 of a locomotive having driving wheels 8 and leading wheels 9. A cylinder 10 and a steam chest 11 appear at the forward end, the exhaust passages 12 of the steam chest being connected to a receiving device 13 in which the pressure of the exhaust is translated into air pressure and the latter delivered through the pipe 14 to the gauge 15 in which latter the small hand 16 is arranged to give a reading of the pressure so delivered. This portion of the apparatus, however, illustrated in Figure 1, forms no part of the present invention but is illustrated and fully described, as well as claimed, in the patent above referred to.

Our improvements, as stated, relate to a speed indicating mechanism which will now be described. The present embodiment of our invention discloses a structure which receives its indication of the speed of the vehicle from one of the driving wheels 8, although it is perfectly obvious that some other portion of the parts of the locomotive which operate in direct proportion to the speed of the vehicle might equally well be employed.

Mounted at some point convenient to the wheel 8 is a metering device 17 which includes, generally considered, a driving or measuring wheel 18, a transmitting idler 19 between the driving wheel 8 and the measuring wheel 18 and a movable metering member or rotor 20. The measuring wheel 18 is mounted upon the bracket or supporting portion 21 by means of an operating shaft 22 as is shown probably to best advantage in Figure 2, the shaft 22 being suitably journalled in the bearings 23. The wheel 18 is keyed or otherwise secured to the shaft so that the shaft and the wheel rotate together.

At one end the shaft 22 is provided with a worm 24 which drives a worm wheel 25 and which latter in turn through the shaft 26 upon which it is mounted drives the rotor 20 through the medium of any suitable flexible interconnection 27.

The transmitting idler 19 is mounted between the arms of a yoke-shaped member 28 which is pivoted upon the pin 29 in the forked end of the supporting arm 31. The arm 31 is carried by the bracket member 21 through the medium of the pin connection 32, the arrangement being such as to permit the arm to have a limited degree of rocking movement upon the pin 32. The arm 31 is provided with a rearward extension 33 between the end of which and a suitable portion of the supporting mechanism is arranged to react a spring 34. It will be seen, therefore, that the transmitting idler wheel 19 is held in place between the driving wheel 8 and the measuring wheel 18 not only by the effect of gravity but also by means of the pressure of spring 34 acting upon the stub end 33 of the arm 31. In this way suitable frictional contact is at all times maintained between the transmitting idler 19 and the driving wheel 8 on the one hand and the measuring wheel 18 on the other hand.

The rotor 20 is mounted in a block 35 which is suitably attached to the interior of one of the walls of the chamber or housing 36. Fluid, preferably air under pressure, is delivered by the pipe 37 to the inlet passage 38 in the block 35. The inlet passage has a port 39 which delivers to the face of the rotor 20, the rotor 20 being provided with a series of fluid receiving and transferring pockets 40 which act to carry or transfer the air from the port 39 to one or the other of the ports 41 and 42 which communicate with the outlet passage 43, the latter in turn delivering to the pipe connection 44 which carries the fluid to the flexible tube 15a in the pressure gauge 15. The end of the tube 15a is connected through a suitable lever system 15b, rack 15c and pinion 15d to the shaft 45a of the large hand 45 of the gauge so that the hand 45 will be moved over the scale 45b in accordance with the pressure of the fluid so transmitted.

If the rotor 20 is travelling in a clockwise direction its chambers 40 will carry the air from the inlet port 39 to the port 41 and if in a counterclockwise direction from the port 39 to the port 42 so that regardless of the direction of rotation, i. e., regardless of the direction of travel of the vehicle, the device will operate equally well.

Of course, as the cavities 40 are brought around for additional air from the port 39 there will be a slight back feed of pressure from one or the other of the ports 41 and 42 to the other of these two ports depending upon the direction of rotation. This, however, will be negligible and will not interfere with the operation of the device because it is uniform in either event and further because of the fact that the pressure within the outlet passage 43 will always be less than the pressure wtihin the inlet passage 38.

The fluid (air in the present instance) is delivered to the pipe 37 through a pressure controlling valve 46 which serves to keep the pressure of the air in the pipe 37 at a substantially constant point so that the metering device 17 is always supplied with the fluid which it meters at a substantially constant pressure. The air is taken from the main reservoir 46a through the pipe 46b which delivers to the reducing valve 46c of the air brake system. From the reducing valve 46c the air enters the brake valve pipe 46d and a connection from this latter pipe to the reducing valve 46 is made through the pipe 46e The pipe 44 which carries the metered air to the gauge 15 is provided with a small bleed or vent 44a to the atmosphere which may be located for convenience in the fitting 47. It will be seen therefore that the pressure recorded by the large hand 45 in the gauge 15 will depend entirely upon the speed of the rotor in relation to the pressure coming in through the pipe 37 and that which is delivered to the gauge 15 subject to the leakage which is constantly taking place from the vent just described. The faster the rotation the higher will be the pressure recorded by the hand 45 and the reading of the hand will bear a direct relation to the speed of the vehicle. Therefore, by calibrating the gauge in terms of speed, i. e., miles per hour, as shown in Figure 1A, it is possible to tell at a glance at just what rate the locomotive is travelling.

In order to maintain fluid tight connections between the rotor and the passages 38 and 43, we have provided the following mechanism for constantly though yieldingly urging the rotor upwardly against the ports 39, 41 and 42. In the block 35 below the rotor 20, we provide the valve seating bar 48 which is shaped at the top to conform to the curvature of the rotor. Approximately at its mid point in the bottom, this bar 48 carries a pin 49 which is adapted to bear upon the upper face of the arm 50. One end of the arm 50 is suitably pivoted by means of the bifurcations 51 upon a pin 52 which latter is carried by a stub pin 53 which projects downwardly from the block 35. The other end of the arm 50 is pivoted by means of the pin 54 to the bottom of the rod 55 which extends upwardly through the block 35 through a suitable aperture 56.

The rod 55 at its top carries a threaded nut 57 between which and the shoulder 58 is adapted to react a spring 59, the tension of the spring 59 being adjustable, of course, by means of the threaded nut 57.

By means of the structure just described it will be seen that constant yielding pressure is applied to the under side of the member 48 so that the latter presses against the rotor 20 in such a way as to maintain tight joints at the ports 39, 41 and 42.

The rotating parts within the chamber or housing 36 are run in a suitable bath of oil, the chamber being filled preferably to the level of the pet cock 60.

It will be seen, of course, that the drive from the wheel 8 to the wheel 18 is by means of frictional contact with the idler 19 and in order to concentrate the wear upon a single member, we prefer to construct the transmitting idler 19 with a contacting surface of some special friction material which will wear more rapidly than either the wheel 8 or the wheel 18. Many materials of this type are known to the art so that any which may be suitable may be employed. In this way we concentrate the wear upon the wheel 19 which wheel or its contacting surface can be readily replaced whenever necessary. By concentrating the wear on the idler we avoid wear on the wheel 18 where it would cause inaccuracy in the readings.

The device is exceedingly simple in principle as well as in structure and operation, it can be inexpensively manufactured and maintained and the percentage of error in the reading is reduced to an absolute minimum. Furthermore, the accuracy of the device can be checked by means of the use of straight air pressure. All mechanical operating connections between the driving point and the recording point are eliminated which, of course, avoids the problems commonly incident to the use of such driving connections as chains, wires, or belts.

In the modifications of Figure 7 we have used an oscillating motion for the movable metering member 20a instead of a rotary motion although the principle of the device as a whole remains exactly the same. In this arrangement the member 20a is moved first in one direction and then in the opposite direction by means of the crank arm 61 which is connected to the upper end of the valve gear link 62 by the connecting rod 63. This motion carries the chamber 40a back and forth between the ports 39a and 42a so that the air coming in through the passage 38 is metered to the outlet passage 43 in accordance with the speed of oscillation which, of course, is determined by the speed of the vehicle.

What we claim is:—

1. A speedometer including in combination, a casing having an inlet and an outlet, a rotor having a chamber for passing fluid from the inlet to the outlet, said outlet having a port communicating with the rotor chamber at each side of the point where the inlet communicates with said chamber, whereby the fluid may be metered regardless of the direction in which the rotor may be turning, means for driving the rotor in ratio with the speed of the vehicle, a gauge for reading the metered air in terms of speed, and vented means for delivering metered air from said outlet to said gauge.

2. A speedometer including in combination, a casing having an inlet and an outlet, a rotor having a chamber for passing fluid from the inlet to the outlet, means for driving the rotor in ratio with the speed of the vehicle, means for yieldingly urging the rotor toward the inlet and outlet connections, a gauge for reading the metered air in terms of speed, and vented means for delivering metered air from said outlet to said gauge.

3. In a speedometer, a fluid pressure responsive gauge, vented means for delivering fluid to said gauge, a source of fluid under substantially constant pressure, and a device for delivering fluid under pressure from said source through said means to the gauge, said device including a movable member having a chamber therein, a casing in which said device is movable, the casing having an inlet port in communication with said source and an outlet port in communication with the means for delivering fluid to the gauge, the ports being positioned with respect to the chamber in such manner that upon movement of said member the chamber is brought into communication with said ports alternately, and means for moving said member, in accordance with the speed to be measured, alternately into communication with said ports to bodily transport measured volumes of fluid in said chamber from the inlet port to the outlet port.

4. A vehicle speedometer including, in combination with a vehicle wheel rotatable in forward and reverse directions, a fluid pressure responsive gauge, vented means for delivering fluid pressure to the gauge, a source of fluid under substantially constant pressure, and a mechanism driven by said wheel in either direction of rotation thereof for delivering fluid from the source to the gauge through said means, said mechanism including a rotary member having a fluid pressure chamber therein, and a casing surrounding the rotary member and having an inlet port in communication with the source of fluid and a pair of outlet ports both in communication with the means for delivering fluid to the gauge, all of said ports being located in relatively close circumferential spacing about the rotary member substantially at one side thereof, and the inlet port being circumferentially located intermediate the outlet ports, and said chamber and ports being relatively positioned to bodily transport measured volumes of fluid from the inlet port to one of the respective outlet ports, depending upon the direction of rotation of the wheel, by movement of the rotary member throughout an arc constituting only a minor fraction of the circumference of the rotary member.

5. A vehicle speedometer including, in combination with a member rotatable in timed relation to a wheel of the vehicle, a fluid pressure gauge, vented means for delivering fluid pressure to the gauge, a source of fluid under substantially constant pressure, and a mechanism for delivering fluid from said source to the gauge through said means, said mechanism including a fluid metering device adapted to deliver measured quantities of fluid from said source to the gauge, and means for actuating the metering device including a friction-driven operating gear, a friction-driven transmitting idler in engagement with said rotary member and with the driven gear, said driven gear and idler being respectively formed of relatively hard and soft materials whereby to concentrate wear on the idler, and means for yieldingly maintaining the serial frictional driving engagement of said member, idler and driven gear.

6. A vehicle speedometer including, in combination with a wheel having a tread adapted to ride on the vehicle supporting surface, a fluid pressure gauge, vented means for delivering fluid pressure to the gauge, a source of fluid under substantially constant pressure, and a mechanism for delivering fluid from said source to the gauge through said means, said mechanism including a fluid metering device adapted to deliver measured quantities of fluid from said source to the gauge, and means for actuating the metering device including a friction-driven operating gear, a friction-driven transmiting idler in engagement with the tread of said wheel and with the driven gear, said driven gear and idler being respectively formed of relatively hard and soft materials whereby to concentrate wear on the idler, and means for yieldingly maintaining the serial frictional driving engagement of said wheel, idler and driven gear.

EDWIN S. PEARCE.
EDMOND C. KARIBO.